US00RE42436E

(19) United States
(12) Reissued Patent
Rogers

(10) Patent Number: US RE42,436 E
(45) Date of Reissued Patent: Jun. 7, 2011

(54) CHAIN RING PROTECTOR

(75) Inventor: James K. Rogers, Portland, OR (US)

(73) Assignee: Eko Sport, Inc., Grand Junction, CO (US)

(21) Appl. No.: 12/017,391

(22) Filed: Jan. 22, 2008

Related U.S. Patent Documents

Reissue of:
(64) Patent No.: 7,066,856
Issued: Jun. 27, 2006
Appl. No.: 10/236,766
Filed: Sep. 6, 2002

(51) Int. Cl.
*B62J 23/00* (2006.01)
*B62K 19/44* (2006.01)

(52) U.S. Cl. ..... 474/144

(58) Field of Classification Search ..... 474/140, 474/144–145, 156, 160; 74/606 R, 609, 74/594.2; 280/304.3; D12/127
See application file for complete search history.

(56) References Cited

U.S. PATENT DOCUMENTS

| | | | | | |
|---|---|---|---|---|---|
| 968,304 | A | * | 8/1910 | Winslow | 474/144 |
| 1,325,206 | A | | 12/1919 | Raybon | |
| 1,400,131 | A | | 12/1921 | Adams | |
| 1,636,327 | A | | 7/1927 | Roe | |
| 3,184,993 | A | | 5/1965 | Swenson | |
| D208,683 | S | * | 9/1967 | Schreckengost | D12/127 |
| 3,416,385 | A | | 12/1968 | Schenk | |
| 3,477,303 | A | * | 11/1969 | Brilando | 474/144 |
| 3,785,219 | A | | 1/1974 | Anthamatten | |
| 3,815,439 | A | * | 6/1974 | Tarutani | 474/160 |
| 3,835,729 | A | | 9/1974 | Tarutani | |
| 3,869,138 | A | | 3/1975 | Allison | |
| 3,910,136 | A | | 10/1975 | Juy | |
| 3,973,447 | A | | 8/1976 | Nagano | |
| 4,044,621 | A | | 8/1977 | McGregor, Sr. | |
| 4,078,444 | A | | 3/1978 | Huret | |
| 4,106,357 | A | | 8/1978 | Segawa | |
| 4,135,727 | A | | 1/1979 | Campagnolo | |
| 4,237,743 | A | | 12/1980 | Nagano | |
| 4,240,303 | A | * | 12/1980 | Mosley | 474/144 |
| 4,330,137 | A | | 5/1982 | Nagano | |
| 4,337,933 | A | | 7/1982 | Egami | |
| 4,380,445 | A | * | 4/1983 | Shimano | 474/144 |
| 4,433,963 | A | | 2/1984 | Shimano | |
| 4,439,172 | A | | 3/1984 | Segawa | |
| 4,475,894 | A | | 10/1984 | Sugino | |
| 4,487,424 | A | * | 12/1984 | Ellis | 74/594.2 |
| 4,498,890 | A | | 2/1985 | Sutherland | |
| 4,507,105 | A | | 3/1985 | Stottmann | |
| 4,515,386 | A | | 5/1985 | Tsujimura | |

(Continued)

FOREIGN PATENT DOCUMENTS

| | | |
|---|---|---|
| DE | 2058799 | 11/1970 |

(Continued)

*Primary Examiner* — Marcus Charles
(74) *Attorney, Agent, or Firm* — Jason H. Foster; Kremblas & Foster

(57) ABSTRACT

A chain ring protector having a substantially planar mounting bracket operably secured to the bottom bracket sleeve of a vehicle with a durable semi-circumferential guard extending therefrom is disclosed. The durable guard has a substantially arcuate outer edge sized to approximate the outer diameter of a chain ring, and it is operably secured to the planar mounting bracket such that the outer edge extends slightly beyond the outer diameter of the portion of the chain ring extending below the bottom bracket sleeve.

22 Claims, 4 Drawing Sheets

U.S. PATENT DOCUMENTS

| | | | | | |
|---|---|---|---|---|---|
| 4,573,950 | A | | 3/1986 | Nagano | |
| 4,632,416 | A | | 12/1986 | Zelenetz | |
| 4,639,240 | A | | 1/1987 | Liu | |
| 4,662,862 | A | | 5/1987 | Matson | |
| D298,613 | S | | 11/1988 | McMurtrey | |
| 4,832,667 | A | | 5/1989 | Wren | |
| 4,854,924 | A | | 8/1989 | Nagano | |
| 4,905,541 | A | | 3/1990 | Alan | |
| 5,002,520 | A | | 3/1991 | Greenlaw | |
| 5,003,840 | A | * | 4/1991 | Hinschlager | 474/144 |
| 5,018,564 | A | | 5/1991 | Anglin | |
| 5,067,930 | A | | 11/1991 | Morales | |
| D323,309 | S | | 1/1992 | Perry | |
| 5,134,901 | A | * | 8/1992 | Grady | 74/606 R |
| 5,320,582 | A | | 6/1994 | Takeda | |
| 5,320,583 | A | * | 6/1994 | van Wingen born Looyen | 474/144 |
| 5,326,331 | A | | 7/1994 | Hallock, III | |
| D355,872 | S | * | 2/1995 | Haney et al. | D12/127 |
| 5,460,576 | A | | 10/1995 | Barnett | |
| 5,496,222 | A | | 3/1996 | Kojima et al. | |
| 5,540,118 | A | | 7/1996 | Calendrille, Jr. | |
| 5,620,384 | A | | 4/1997 | Kojima et al. | |
| 5,676,616 | A | | 10/1997 | Hara | |
| 5,679,084 | A | | 10/1997 | Daniels, III | |
| 5,725,450 | A | | 3/1998 | Huskey | |
| 5,728,018 | A | | 3/1998 | Terada et al. | |
| 5,782,714 | A | | 7/1998 | Osgood | |
| 5,846,148 | A | | 12/1998 | Fujii | |
| 6,039,665 | A | | 3/2000 | Nakamura | |
| 6,083,132 | A | | 7/2000 | Walker | |
| 6,117,032 | A | | 9/2000 | Nankou | |
| 6,165,092 | A | | 12/2000 | Bramham et al. | |
| 6,203,459 | B1 | | 3/2001 | Calendrille, Jr. | |
| 6,332,853 | B1 | | 12/2001 | Bowman | |
| 6,354,973 | B1 | * | 3/2002 | Barnett | 474/140 |
| 6,416,434 | B1 | | 7/2002 | Calendrille, Jr. | |
| 6,533,690 | B2 | | 3/2003 | Barnett | |
| 6,988,427 | B2 | | 1/2006 | Yamanaka | |
| 7,059,983 | B2 | | 6/2006 | Heim | |
| 7,066,856 | B1 | | 6/2006 | Rogers | |
| 7,066,857 | B1 | | 6/2006 | DeRosa | |
| 2002/0160869 | A1 | | 10/2002 | Barnett | |
| 2004/0009835 | A1 | | 1/2004 | Heim | |
| 2004/0254038 | A1 | | 12/2004 | Chamberlain | |

FOREIGN PATENT DOCUMENTS

| | | | | | |
|---|---|---|---|---|---|
| DE | 3421210 | A1 | * | 12/1984 | |
| DE | 3417336 | | | 11/1985 | |
| DE | 3417336 | A1 | * | 11/1985 | 474/111 |
| DE | 3537615 | A1 | * | 4/1987 | |
| DE | 4126156 | | | 3/1992 | |
| DE | 4126156 | A1 | * | 3/1992 | |
| DK | 96297 | | | 7/1939 | |
| EP | 1288119 | A2 | * | 3/2003 | |
| JP | 11020764 | A | * | 1/1999 | |
| NL | 7800724 | | | 7/1979 | |
| NL | 9300333 | | * | 9/1994 | |
| SU | 1199696 | | | 12/1985 | |
| SU | 1199696 | A | * | 12/1985 | 474/144 |

* cited by examiner

CHAIN RING PROTECTOR

Matter enclosed in heavy brackets [ ] appears in the original patent but forms no part of this reissue specification; matter printed in italics indicates the additions made by reissue.

*This is a reissue application of U.S. application Ser. No. 10/236,766, which issued as U.S. Pat. No. 7,066,856.*

FIELD OF THE INVENTION

The present invention relates to a protector for chain rings on bicycles and the like. In particular, it includes a mounting bracket operably secured to the bottom bracket sleeve with a durable guard extending therefrom and detachably secured thereto.

BACKGROUND OF THE INVENTION

Wheeled vehicles and especially in-line, two-wheeled vehicles such as bicycles, motorcycles, scooters, and the like, are popular forms of transportation, exercise, and sport. More recently, such vehicles are being used in particularly rugged environments including operating over unimproved roads and rough terrain, and for stunt riding over stairs and the like. For example, a form of bicycle commonly known as a mountain bike is specifically intended for off-road operation.

Most two-wheeled vehicles are propelled by a chain operably extending between two or more sprockets. One sprocket, commonly known as a chain ring, is driven by a power source such as a crank and pedal assembly. In bicycles, the chain ring is operably secured to a lower hub of the bicycle's frame which is commonly known as the lower bracket sleeve. The crank and pedal assembly usually have an axis of rotation centered along a centerline extending through the lower bracket sleeve.

Chain rings are usually planar disks with teeth along their outer diameter for engaging the chain. In order for the chain ring to operate effectively, it must remain substantially planar and the teeth must remain intact during operation of the vehicle. However, portions of most chain rings remain exposed and extend below the bicycle frame. Accordingly, chain rings are susceptible to bending and damage caused by inadvertent impact with objects.

This susceptibility is increased with off-road and stunt riding of the vehicle. For example, a rider of a mountain bicycle may frequently attempt to jump small objects such as rocks and fallen trees. If the rider executes a jump and in the process lands the bicycle such that a large rock straddles the front and rear wheels, the chain ring can impact the rock causing damage to the chain ring.

Attempts to protect the chain ring from inadvertent impacts have had limited success. For example, U.S. Pat. No. 5,320,583 to van Wingen born Looyen teaches securing a circular disk to the exterior planar surface of a chain ring such that the circular disk and chain ring are substantially parallel to each other and rotatable on the same axis or rotation. As a rider pedals, the chain ring and circular disk rotate about the axis of rotation. The circular disk contacts some objects approaching the chain ring first, thereby protecting the chain ring to a certain degree. However, since the circular disk is directly connected to the chain ring and drive shaft, any bending or damage of the circular disk caused by the impact will likely also bend the attached chain ring or drive shaft. Moreover, such circular disks offer negligible protection from impacts to the chain ring arising from contact with objects positioned toward the inside surface of the chain ring.

Inventors have also attempted to extend a chain ring protector directly from the bicycle's frame. For example, U.S. Pat. No. 5,067,930 to Morales teaches extending a trough-type protector from forward and aft struts mounted to the frame. The curved trough-type protector extends below the chain ring, thereby protecting it from inadvertent impact. A first clamp for securing the forward strut is positioned on a rail of the frame extending forward from the mounting bracket sleeve. A second clamp for securing the aft strut is positioned on rear wheel forks extending rearward from the mounting bracket sleeve. In an effort to allow the through-type protector to accommodate different bicycle designs, a swivel is provided between the first clamp and front strut.

Despite the benefits of the Morales design, it has several drawbacks. For example, a large amount of hardware, such as the first and second clamps, pivot structure, and struts, is required to support the protector, thereby increasing the expense of the structure and time required to mount and align it properly. Similarly, not all bicycles have the frame structure stemming from the mounting bracket sleeve as shown in Morales. Accordingly, the first and second clamps and orientation taught in Morales may not be operable when attempting to install the Morales protector on these different frame structures.

In addition, the length of the struts determines the size of the chain ring that may be used with it. Despite the limited adjustability provided by the swivel, if the struts are too short, a trough-type protector will not extend below the chain ring. Also, if the struts are too long, the trough-type protector can interfere with operation of the bicycle. In addition, under some impacts on the trough-type protector, the swivel structure can actually allow the trough-type protector to deflect into to the chain ring, thereby damaging it, or at least forcing the rider to stop to realign the protector.

SUMMARY OF THE INVENTION

Accordingly, despite the benefits of the known chain ring protectors, there remains a need for a simple, cost effective, easy to install and adjust, chain ring protector that can be operably secured to a large number of vehicles independent of a particular frame design, and that can effectively protect any sized chain ring operably installed on a vehicle without interfering with operation of the vehicle. In addition to other benefits that will become apparent in the following disclosure, the present invention fulfills these needs.

The present invention is a substantially planar mounting bracket operably secured to the bottom bracket sleeve of a vehicle with a durable guard extending therefrom. The durable guard has a substantially arcuate outer edge sized to approximate the outer diameter of a chain ring, and it is operably secured to the planar mounting bracket such that the outer edge extends slightly beyond the outer diameter of the chain ring in which it is protecting.

Preferably, the durable guard is detachably secured to the mounting bracket, and the mounting bracket includes a plurality of mounting portions thereon, thereby allowing a large variety of possible mounting configurations for the durable guard. More preferably, the guard includes parallelly aligned slots extending therethrough for operably engaging the mounting portions, thereby allowing the outer edge of the durable guard to be adjusted simply by sliding the durable guard along the slots toward or away from the bottom bracket sleeve.

Since the durable guard is detachably secured to the mounting bracket, the durable guard may be replaced easily if it becomes damaged or worn, or if a different sized durable guard is desired.

In an alternative embodiment, a second chain ring protector can be installed on the opposite side of the bottom bracket sleeve, and the two chain ring protectors can be operably secured together with a stabilizing bracket extending therebetween.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

A simple, cost effective, easy to install and adjust, chain ring protector 10 operably secured to the lower bracket sleeve 12 of a vehicle, such as a bicycle 14, is shown in FIGS. 1-5B.

Figure 1:
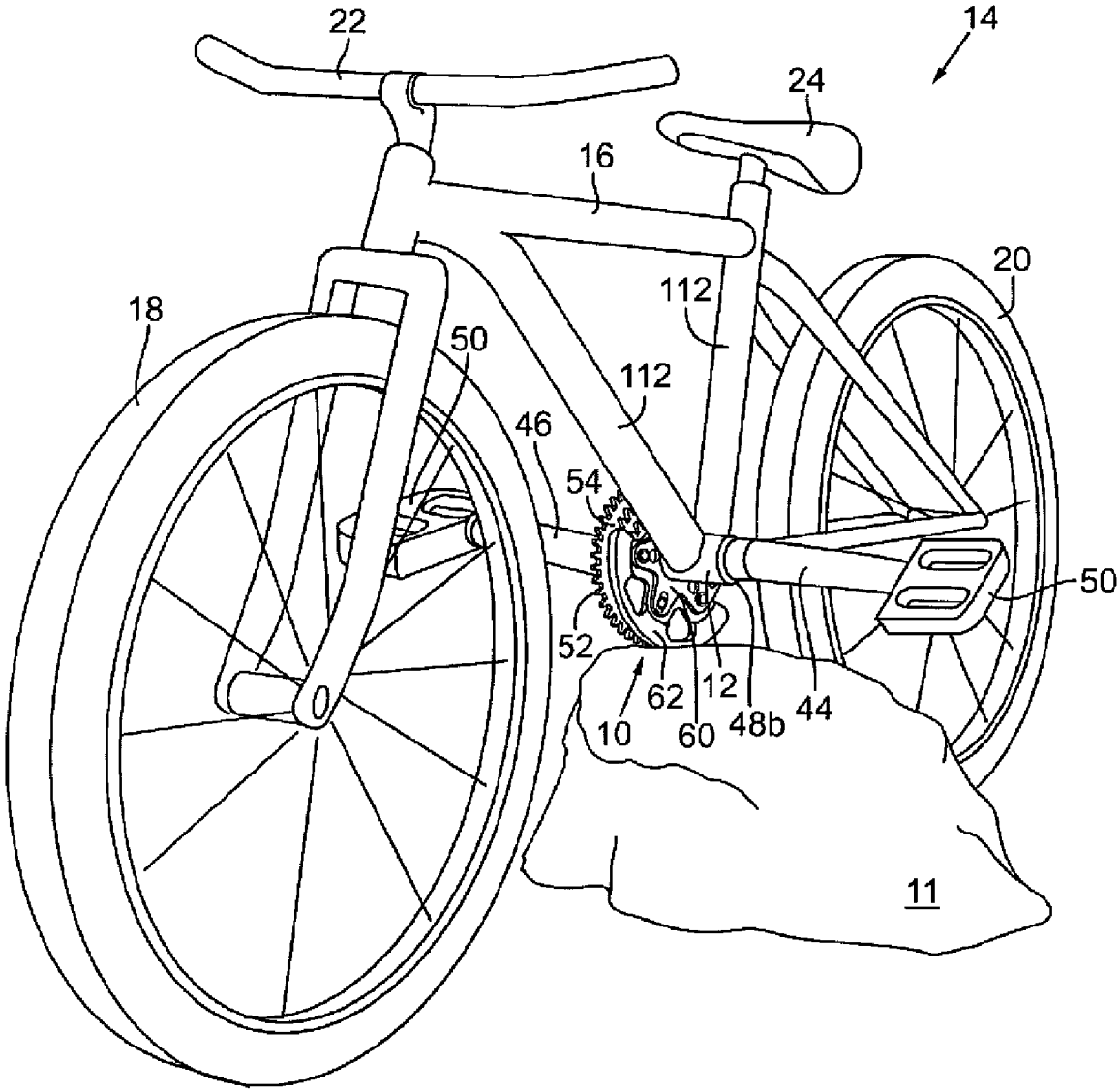
FIG. 1 is an isometric front, right view of a bicycle having a chain ring protector installed thereon in accordance with an embodiment of the present invention.

Referring to FIG. 1, the bicycle 14 includes a frame 16 having a front wheel 18, back wheel 20, handle bars 22, seat 24, and the lower bracket sleeve 12 operably secured thereto. Preferably, the lower bracket sleeve 12 is reverse threaded to accept the threads of a conventional lower bracket spindle 26 (FIG. 2) therethrough. The lower bracket spindle 26 is a common, commercially available product, and includes a shaft 28 operably received within a housing 30. The shaft 28 rotates about a longitudinal centerline 32. Usually, bearings (not shown) are sealed within the housing 30 to facilitate rotation of the shaft 28.

Preferably, the housing 30 includes the reverse threads 34 toward one end 36 with a lip 38 adjacent to those threads 34. More preferably, the housing 30 also includes a recess 40 and spaced-apart notches 42 to allow a mating wrench portion (not shown) to be detachably secured thereto. According, the mating wrench portion may be used to tighten and loosen the lower bracket spindle 26 to the lower bracket sleeve 12.

Left and right cranks 44, 46, respectively, are operably secured to the ends 48a, 48b of the lower bracket spindle shaft 28 with a pivoting pedal 50 secured at the opposite ends of each crank 44, 46. At least one sprocket having teeth 52 extending radially therefrom is secured to the lower bracket spindle and positioned on one side of the lower bracket sleeve 12. This sprocket is also commonly known as a chain ring 54. Usually, the chain ring 54 is also secured to one of the cranks 44, 46.

A continuous loop chain (not shown) encircles the chain ring 54 and operably engages the teeth 52 of the chain ring 54. The chain also engages a second sprocket (not shown) operably secured to one of the front and rear wheels of the bicycle 14. Accordingly, when an operator pedals the bicycle by alternatingly urging the left and right cranks 44, 46, respectively, to spin the shaft 28, the chain ring 54 urges the chain to spin one of the wheels of the bicycle.

Figure 2:
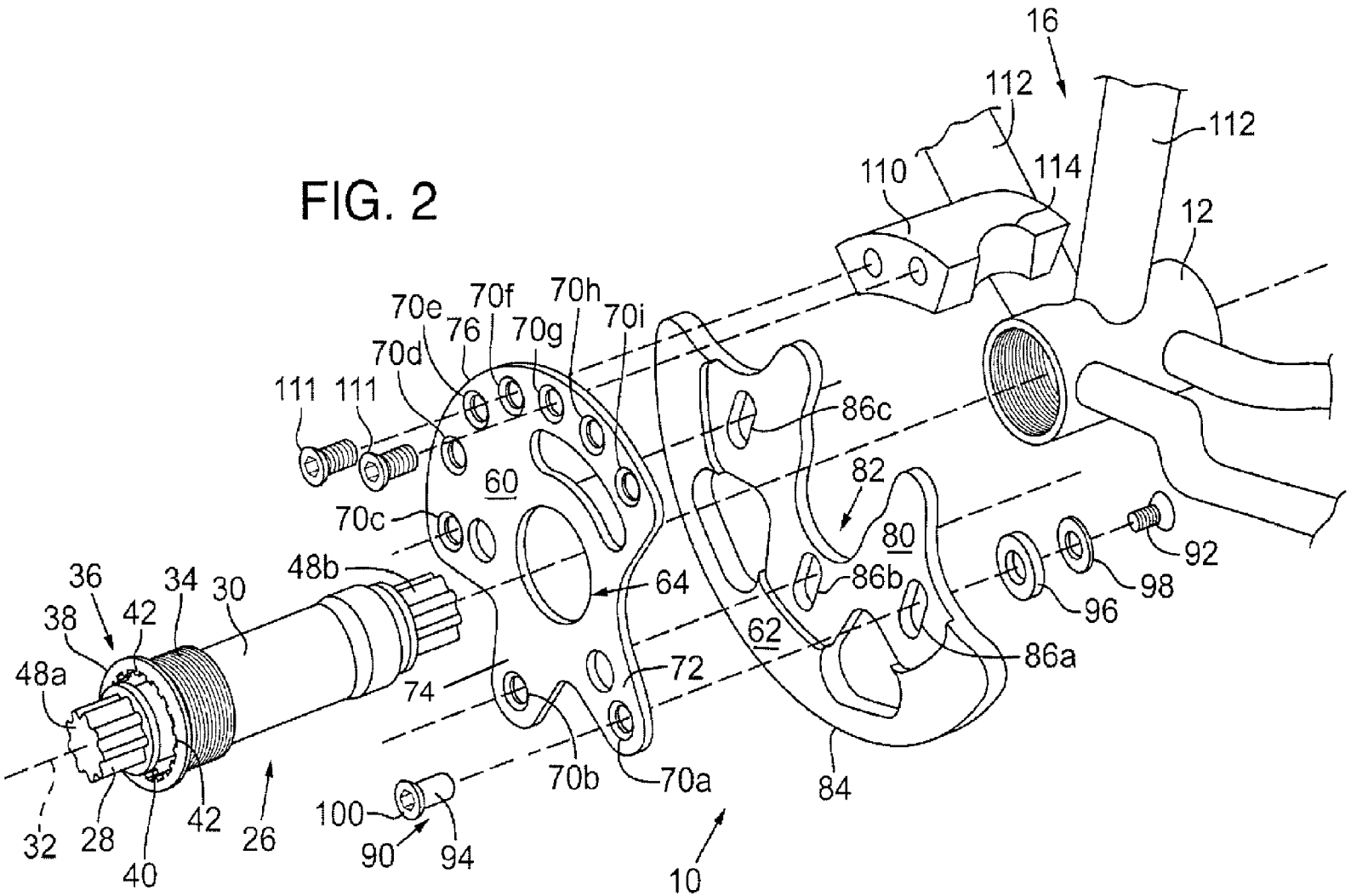
FIG. 2 is an enlarged, fragmentary, exploded, isometric view of the chain ring protector shown in FIG. 1.
Figure 3:
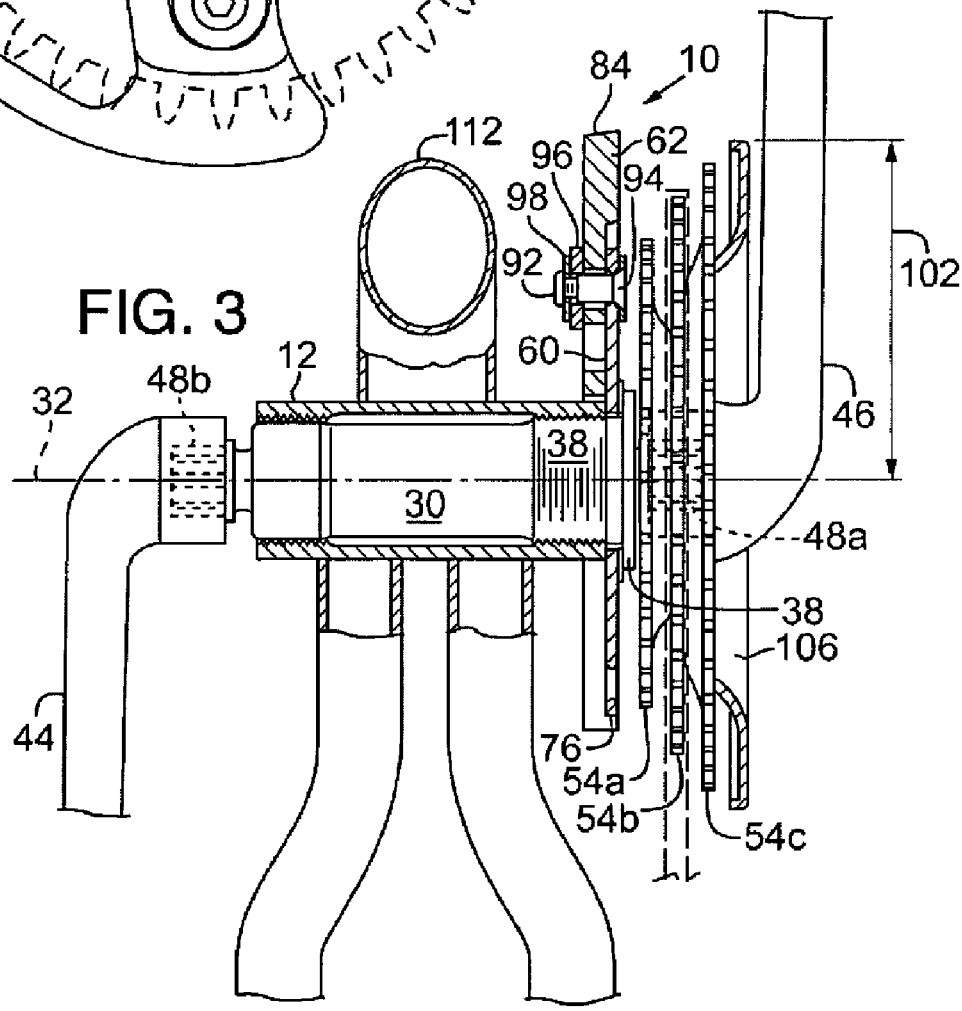
FIG. 3 is a sectional view taken along line 3-3 of FIG. 1.

As best shown in FIGS. 2 and 3, the chain ring protector 10 is operably secured to the lower bracket sleeve 12. For example, the chain ring protector 10 can include a substantially planar mounting bracket 60 with an impact resistant and durable guard 62 extending therefrom. The mounting bracket 60 includes a central bracket mounting hole 64 for receiving the lower bracket spindle 26 therethrough. It can be appreciated that by tightening the lower bracket spindle 26 on the threads of the lower bracket sleeve 12, the mounting bracket 60 operates much like a conventional washer and is thereby secured in place when the lip 38 of the lower bracket spindle housing 30 tightens against the mounting bracket 60.

The mounting bracket 60 includes a plurality of guard mounting holes 70a-i thereon. Preferably, the mounting bracket 60 has two arms 72, 74 extending from the central bracket mounting hole 64 and a substantially circular outer edge 76 extending from the central bracket mounting hole 64 opposite the arms 72, 74 as best shown in FIG. 2. Each of the arms 72, 74 has a guard mounting hole 70a, 70b, respectively, thereon. Also, a plurality of guard mounting holes 70c-i are aligned along the circular outer edge 76.

The guard 62 has a substantially planar mounting portion 80 with an opening 82 to prevent it from interfering with the lower bracket spindle 26. A substantially arcuate outer edge 84 extends radially from the opening 82 as best shown in FIG. 2. The mounting portion 80 includes a plurality of mounting slots 86a-c, which are preferably parallelly aligned and spaced-apart from each other. Each slot 86a-c is positioned to align with one guard mounting hole 70a-c on the mounting bracket 60. For example, slot 86a aligns with mounting hole 70a, slot 86b aligns with mounting hole 70b, and slot 86c aligns with mounting hole 70c.

Connectors 90 extend through each aligned mounting hole and slot combination. Preferably, each connector includes a screw 92 being operably received into an internally threaded shaft 94 with a resilient washer 96 operably engaging the guard 62 and a lock washer 98 holding the screw 92 in place. More preferably, the internally threaded shaft 94 has a tapered head 100 and is recessed within the guard mounting hole (70a shown in FIG. 2) when the screw 92 is tightened.

Figure 4:
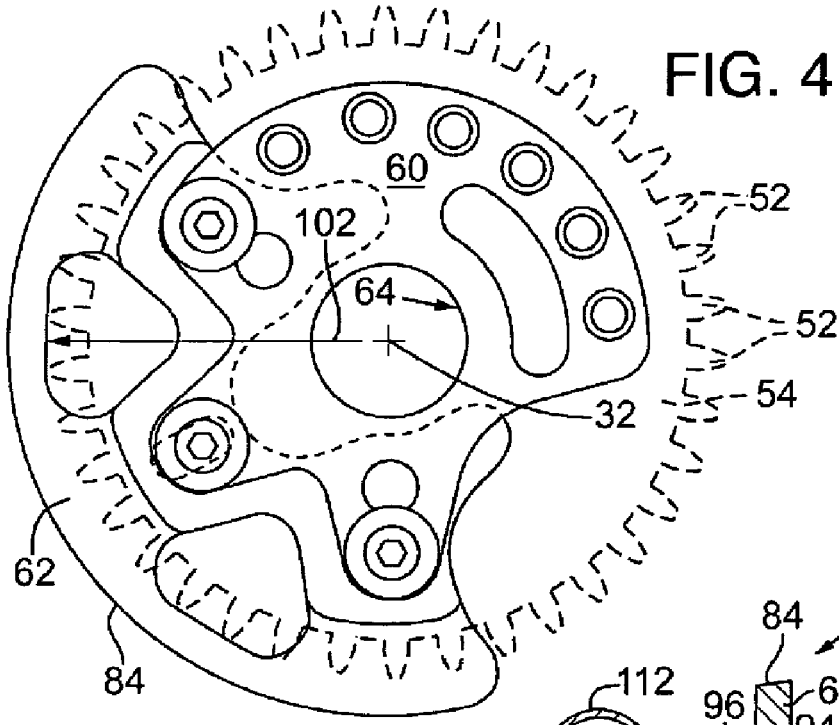
FIG. 4 is a side view of the chain ring protector showing a possible orientation with respect to a chain ring.

Preferably, the mounting slots 86a-c are aligned to allow the substantially arcuate outer edge 84 to move toward or away from the lower bracket spindle 26 when the guard 62 is mounted to the mounting bracket 60. As shown in FIG. 4, the mounting slots 86a-c allow the position of the arcuate outer edge 84 of the guard 62 to extend past the outer radius 102 of the chain ring 54. Moreover, the mounting slots 86a-c allow the guard 62 to be individually adjusted for any particular chain ring 54 size, without necessarily requiring different guards 62 to protect different sized chain rings 54.

The guard 62 and mounting bracket 60 are constructed of durable, impact resistant materials. One known preferred guard material is Ultra-High Molecular Weight polyethylene or plastic, which is commonly known in the materials industry as "UHMW." One known acceptable mounting bracket material is aluminum, and more preferably a type of aluminum known as "6061 Aluminum."

As shown in FIG. 3, the chain ring protector 10 of the present invention can be used concurrently with a conventional chain ring-mounted protector 106. In such case, the chain ring protector 10 remains fixed to the lower bracket sleeve 12 to protect the chain ring 54 from impacts arising from contact with objects positioned toward the inside surface of the chain ring 54.

It can be appreciated that a plurality of chain rings 54a-c (FIG. 3) can be positioned on the lower bracket spindle shaft 28. In such case, the guard 62 is preferably positioned to extend beyond the outer radius 102 of the largest chain ring 54c (FIG. 3) on the shaft 28 as shown in FIG. 3.

Referring to FIG. 2, if desired, an anti-rotation mount 110 can be secured to the guard mounting holes 70d-i on the mounting bracket 60. The anti-rotation mount 110 extends from the mounting bracket 60 toward the frame 16 and is preferably wedged adjacent to one or two frame members 112 extending from the lower bracket sleeve 12. Preferably, the anti-rotation mount 110 includes a notched recess 114 sized to operably engage the frame members 112. The large number of guard mounting holes 70c-i along the substantially circular outer edge 76 allow the anti-rotation mount 110 to be effectively installed on a wide variety of frame styles and sizes. An installer mounts the anti-rotation mount 110 with bolts 111 extending through one or more of the mounting holes 70c-i on the mounting bracket 60. The installer simply selects the particular mounting holes 70c-i (FIG. 2 shows mounting holes 70f and 70g being used) that best fit that particular frame.

When the chain ring protector 10 is installed on the bicycle 14, the chain ring 54 is protected from inadvertent impacts with an object 11. The mounting bracket also assists with preventing the chain from inadvertently falling off the chain ring. Moreover, the chain ring protector 10 is operably secured directly to the lower bracket sleeve 12, one of the strongest elements of the frame 16. In addition, no portion of the chain ring protector 10 contacts or otherwise engages the chain ring 54 so it will not likely also damage the chain ring 54 in the process of protecting it. Accordingly, should the chain ring protector 10 become damaged during use, it can be easily replaced without removing the mounting bracket 60 from the lower bracket sleeve 12. Since the chain ring protector is secured primarily in place on the lower bracket sleeve using a conventional lower bracket spindle, which is already needed to enable operation of the bicycle, the need for additional mounting hardware beyond the mounting bracket is greatly reduced over the structure disclosed in U.S. Pat. No. 5,067,930 to Morales.

Figure 5A:
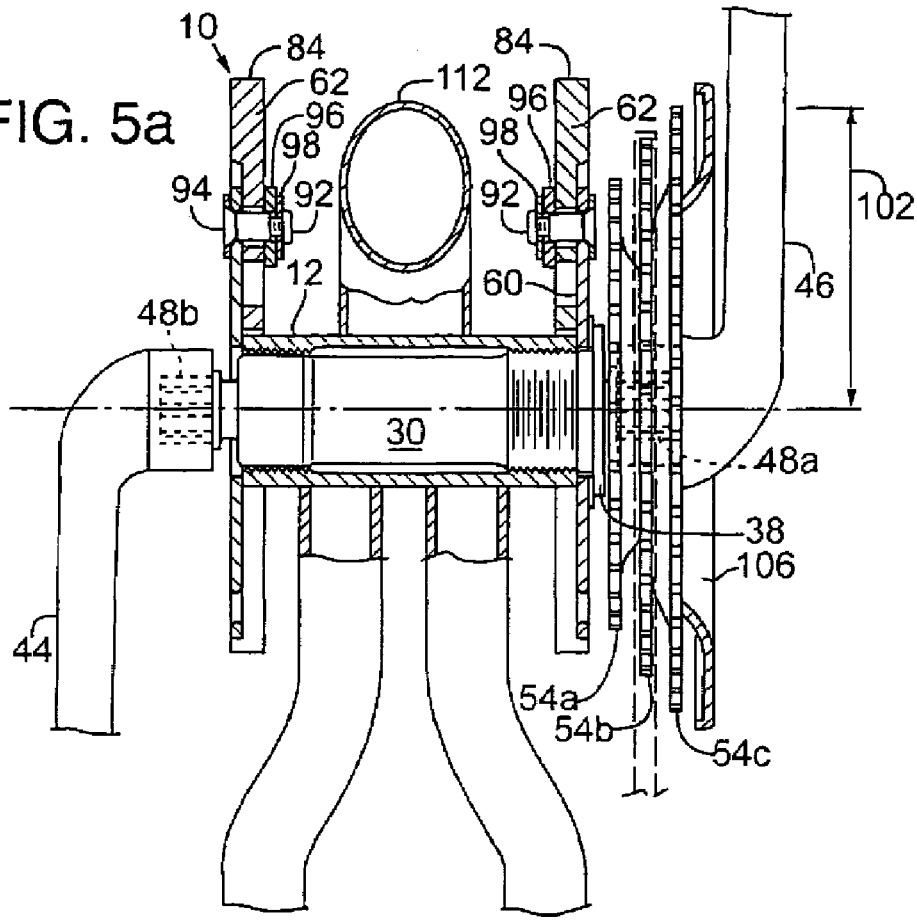
FIG. 5A is a first sectional view of an alternative configuration showing a possible use of two chain ring protectors in accordance with an alternative embodiment of the present invention.
Figure 5B:
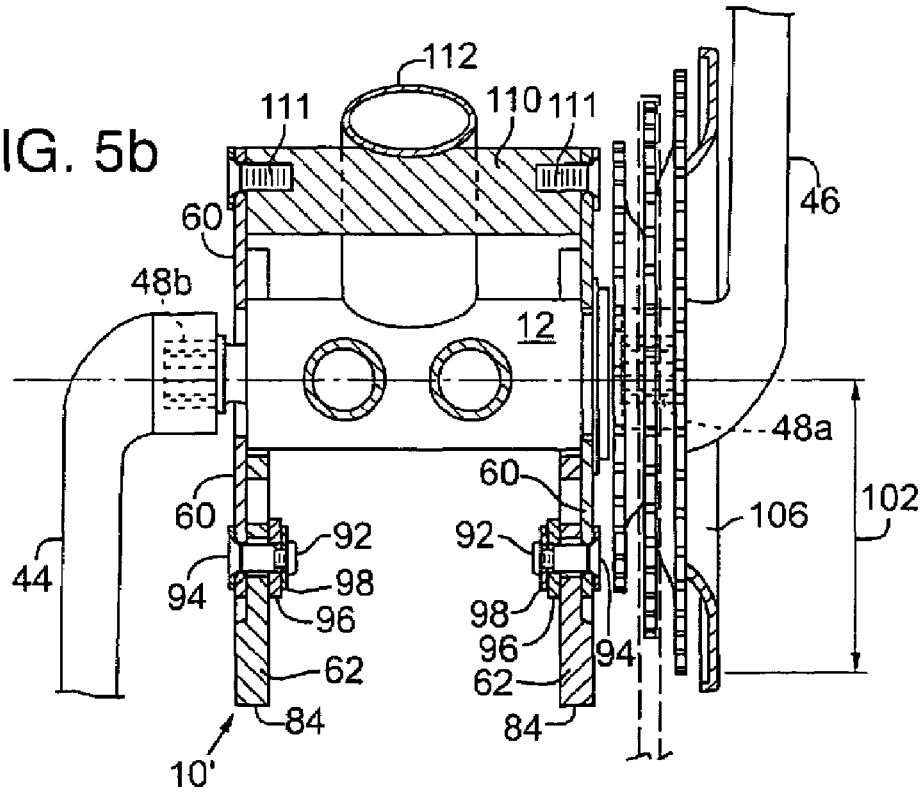
FIG. 5B is a second sectional view of the alternative configuration of FIG. 5A.

In view of the wide variety of embodiments to which the principles of the invention can be applied, it should be apparent that the detailed embodiments are illustrative only and should not be taken as limiting the scope of the invention. For example, and as best shown in FIGS. 5A & 5B, two chain rings protectors 10, 10' can be installed on a lower bracket sleeve 12. One chain ring protector 10 is positioned between the lower bracket sleeve 12 and chain ring 54 as previously described. The other chain ring protector 10' is operably secured to the opposite end of the lower bracket sleeve 12 as shown. Preferably, the opposite end of the lower bracket sleeve 12 includes a threaded portion 120 with a mating threaded mount (not shown) having a lip (not shown) for engaging the mounting bracket 60 of the second chain ring protector 10'. If desired and as shown in FIG. 5B, the anti-rotation mount 110 can extend between the two mounting brackets, thereby securing them in place on the bicycle 14.

Accordingly, the claimed invention includes all such modifications as may come within the scope of the following claims and equivalents thereto.

What is claimed is:

1. A chain ring protector for a vehicle having a frame with a lower bracket sleeve thereon and a lower bracket spindle operably secured thereto, the spindle pivotally securing a chain ring to the frame, the chain ring defining an outer radius with a portion of the chain ring extending below the lower bracket sleeve, said chain ring protector comprising:

a substantially planar mounting bracket portion secured to the lower bracket sleeve such that the substantially planar mounting bracket remains fixed with respect to the frame while the chain ring pivots; [and,]

a semi-circumferential guard portion extending from the substantially planar mount bracket portion adjacent to the chain ring and aligned with the portion of the chain ring extending below the lower bracket sleeve, an outer edge of said guard portion extending past the outer radius *of* the chain ring so as to protect the portion of the chain ring extending below the lower bracket sleeve from inadvertent impacts*; and*

*means for detachably securing said semi-circumferential guard portion to said substantially planar mounting bracket portion so as to allow said semi-circumferential guard portion to be replaced without removing said planar mounting bracket portion from said lower bracket sleeve*.

2. The chain ring protector of claim 1, wherein the spindle includes a threaded end with a lip, and said lower bracket sleeve has mating threads for operably engaging the threaded end of the spindle, and wherein said substantially planar mounting bracket includes an opening for receiving the spindle therethrough such that tightening the spindle on said lower bracket urges the lip to engage the mounting bracket, thereby securing the mounting bracket to the lower bracket sleeve.

[3. The chain ring protector of claim 1, wherein said guard portion is detachably secured to said substantially planar mounting bracket.]

4. The chain ring protector of claim [3] *2*, wherein said guard includes a plurality of parallelly aligned slots thereon and said guard is secured to said mounting bracket through fasteners extending through said slots.

5. The chain ring protector of claim 4, wherein said guard has an substantially arcuate outer edge and the position of said arcuate outer edge with respect to an outer radius of said chain ring is adjustable by sliding said guard along said slots.

6. The chain right protector of claim 1, further including an anti-rotation mount extending from said chain ring protector to the frame.

7. The chain ring protector of claim 6, wherein said anti-rotation mount includes a recess for operably engaging a frame member of the frame.

8. The chain ring protector of claim 1, further including a second chain ring [detector] *protector*, said second chain ring [detector] *protector* operably secured to an opposite end of said lower bracket sleeve and aligned substantially parallel with said chain ring [detector] *protector*.

9. [The chain ring protector of claim 1, further including] *A chain ring protector for a vehicle having a frame with a lower bracket sleeve thereon and a lower bracket spindle operably secured thereto, the spindle pivotally securing a chain ring to the frame, the chain ring defining an outer radius with a portion of the chain ring extending below the lower bracket sleeve, said chain ring protector comprising:*

*a substantially planar mounting bracket portion secured to the lower bracket sleeve such that the substantially planar mounting bracket remains fixed with respect to the frame while the chain ring pivots;*

*a semi-circumferential guard portion extending from the substantially planar mount bracket portion adjacent to the chain ring and aligned with the portion of the chain*

*ring extending below the lower bracket sleeve, an outer edge of said guard portion extending past the outer radius of the chain ring so as to protect the portion of the chain ring extending below the lower bracket sleeve from inadvertent impacts; and* a protective disk operably secured to said chain ring and having an outer radius larger than an outer radius of the chain ring.

10. A bicycle comprising:

a frame having a lower bracket sleeve thereon, forward and aft wheels operably secured to said frame, handle bars operably engaging said forward wheel and operably secured to said frame;

a lower bracket spindle having a pivoting shaft therein, said spindle detachably received though said lower bracket sleeve, said shaft having first and second ends;

a left crank secured to said first end of said shaft;

a right crank secured to said second end of said shaft;

a substantially planar sprocket operably secured to said shaft, for driving said aft wheel by rotation of said sprocket, a portion of said sprocket extending below said lower bracket sleeve by a defined distance;

a substantially planar mounting bracket portion secured to the lower bracket sleeve such that the substantially planar mounting bracket remains fixed with respect to the frame while the sprocket rotates about said shaft; [and,]

a semi-circumferential guard portion extending from the substantially planar mount bracket portion adjacent to the chain ring by a length greater than said defined distance, said semi-circumferential guard portion substantially aligned with said portion of said sprocket extending below said lower bracket sleeve*; and*

*means for detachably securing said semi-circumferential guard portion to said substantially planar mounting bracket portion so as to allow said semi-circumferential guard portion to be replaced without removing said planar mounting bracket portion from said lower bracket sleeve*.

11. The bicycle of claim 10, wherein the spindle includes a threaded end with a lip, and said lower bracket sleeve has mating threads for operably engaging the threaded end of the spindle, and wherein said substantially planar mounting bracket includes an opening for receiving the spindle therethrough such that tightening the spindle on said lower bracket urges the lip to engage the mounting bracket, thereby securing the mounting bracket to the lower bracket sleeve.

[12. The bicycle of claim 10, wherein said guard portion is detachably secured to said substantially planar mounting bracket.]

13. The bicycle of claim [12] *10*, wherein said guard includes a plurality of parallelly aligned slots thereon and said guard is secured to said mounting bracket through fasteners extending through said slots.

14. The bicycle of claim 13, wherein said guard has an substantially arcuate outer edge and the position of said arcuate outer edge with respect to an outer radius of said sprocket is adjustable by sliding said guard along said slots.

15. The bicycle of claim 10, further including an anti-rotation mount, extending from said mounting bracket to the frame.

16. The bicycle of claim 10, further including a protective disk operably secured to said sprocket and having an outer radius larger than an outer radius of the chain ring.

17. The bicycle of claim 10, further Including a plurality of sprockets operably secured to said shaft, with each sprocket of said plurality of sprockets having a different outer radius.

18. The chain ring protector of claim 1, further including adjustment means for adjusting the position of said semi-circumferential guard portion relative to said substantially planar mounting bracket portion so as to allow said outer edge of said guard portion to be adjusted without removing said substantially planar mounting bracket from said lower bracket sleeve.

[19. The chain ring protector of claim 1, further including means for detachably securing said semi-circumferential guard portion to said substantially planer mounting bracket portion so as to allow said semi-circumferential guard portion to be replaced without removing said planar mounting bracket portion from said lower bracket sleeve.]

20. [The chain ring protector of claim 1,] *A chain ring protector for a vehicle having a frame with a lower bracket sleeve thereon and a lower bracket spindle operably secured thereto, the spindle pivotally securing a chain ring to the frame, the chain ring defining an outer radius with a portion of the chain ring extending below the lower bracket sleeve, said chain ring protector comprising:*

*a substantially planar mounting bracket portion secured to the lower bracket sleeve such that the substantially planar mounting bracket remains fixed with respect to the frame while the chain ring pivots; and*

*a semi-circumferential guard portion extending from the substantially planar mount bracket portion adjacent to the chain ring and aligned with the portion of the chain ring extending below the lower bracket sleeve, an outer edge of said guard portion extending past the outer radius of the chain ring so as to protect the portion of the chain ring extending below the lower bracket sleeve from inadvertent impacts;* wherein said chain ring defines a plane, and said chain ring protector is aligned parallel to the plane without intersecting said plane.

*21. The protector of claim 20, wherein the mounting bracket defines an aperture sized to pass at least a portion of a lower bracket spindle shaft therethrough, whereby the mounting bracket contacts no drivetrain component when installed on the bicycle.*

*22. The protector of claim 21, wherein the aperture is sized so the mounting bracket is adapted to be mounted to a bicycle between the lower bracket sleeve and a spindle lip.*

*23. The protector of claim 20, wherein the mounting bracket defines a plurality of bolt mounting holes.*

*24. The protector of claim 23, wherein the protector further comprises a mount adapted to engage at least one bicycle frame tube.*

*25. The protector of claim 24, wherein the mount is notched to wedge between two frame tubes.*

* * * * *

UNITED STATES PATENT AND TRADEMARK OFFICE

CERTIFICATE OF CORRECTION

PATENT NO. : RE42,436 E
APPLICATION NO. : 12/017391
DATED : June 7, 2011
INVENTOR(S) : James K. Rogers It is certified that error appears in the above-identified patent and that said Letters Patent is hereby corrected as shown below:

In the Specification

Column 1, line 12, above the heading, "FIELD OF THE INVENTION" insert:
-- Notice: More than one reissue application has been filed for the reissue of patent 7,066,856. The reissue applications are application numbers 12/814,529, and 10/718,507(the present application), now US RE41380. Application number 12/017,391 a reissue of 10/236,766; 12/017,425 a reissue of 10/236,766; and 13/153,967 continuation reissue application of 12/017,391. --.

Signed and Sealed this
Seventeenth Day of June, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : RE42,436 E
APPLICATION NO. : 12/017391
DATED : June 7, 2011
INVENTOR(S) : James K. Rogers It is certified that error appears in the above-identified patent and that said Letters Patent is hereby corrected as shown below:

In the Specification

Column 1, line 12, above the heading, "FIELD OF THE INVENTION" insert:
-- Notice: More than one reissue application has been filed for the reissue of patent 7,066,856. The reissue applications are 12/017,391 a reissue of 10/236,766; 12/017,425 a reissue of 10/236,766; and 13/153,967 continuation reissue application of 12/017,391. --.

This certificate supersedes the Certificate of Correction issued June 17, 2014.

Signed and Sealed this
Twenty-third Day of September, 2014

Michelle K. Lee

Michelle K. Lee
*Deputy Director of the United States Patent and Trademark Office*